(12) United States Patent
He

(10) Patent No.: US 10,374,684 B2
(45) Date of Patent: Aug. 6, 2019

(54) TRANSPORT BLOCK RETRANSMISSION METHOD AND BASE STATION

(71) Applicant: HUAWEI TECHNOLOGIES CO., LTD., Shenzhen, Guangdong (CN)

(72) Inventor: Longke He, Chengdu (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/194,088

(22) Filed: Nov. 16, 2018

(65) Prior Publication Data

US 2019/0089445 A1   Mar. 21, 2019

Related U.S. Application Data

(63) Continuation of application No. PCT/CN2016/082297, filed on May 17, 2016.

(51) Int. Cl.
| | | |
|---|---|---|
| H04B 7/06 | (2006.01) | |
| H04B 7/0413 | (2017.01) | |
| H04L 1/18 | (2006.01) | |
| H04W 76/28 | (2018.01) | |
| H04L 1/00 | (2006.01) | |

(Continued)

(52) U.S. Cl.
CPC ......... *H04B 7/0697* (2013.01); *H04B 7/0413* (2013.01); *H04L 1/0057* (2013.01); *H04L 1/1819* (2013.01); *H04L 1/1867* (2013.01); *H04W 28/06* (2013.01); *H04W 76/28* (2018.02); *H04W 72/1289* (2013.01)

(58) Field of Classification Search
CPC . H04W 76/28; H04W 28/06; H04W 72/1289; H04L 5/0055; H04L 1/18; H04L 1/0025; H04L 1/1825; H04L 1/1864; H04L 1/06; H04L 1/0057; H04L 1/1819; H04L 1/1867; Y02D 70/124; Y02D 70/126; Y02D 70/1262; Y02D 70/1264; Y02D 70/25; H04B 7/0697; H04B 7/0413
See application file for complete search history.

(56) References Cited

U.S. PATENT DOCUMENTS

| | | |
|---|---|---|
| 8,917,796 B1 | 12/2014 | Mayrench et al. |
| 2009/0279631 A1 | 11/2009 | Chen et al. |

(Continued)

FOREIGN PATENT DOCUMENTS

| | | |
|---|---|---|
| CN | 101631374 A | 1/2010 |
| CN | 101938336 A | 1/2011 |

(Continued)

*Primary Examiner* — Rahel Guarino
(74) *Attorney, Agent, or Firm* — Womble Bond Dickinson (US) LLP

(57) ABSTRACT

A transport block retransmission method and a base station are described. In the method, for first m retransmissions of a transmission block (TB), a closed-loop spatial multiplexing transmit manner for initial transmission of the TB is maintained. The method may also include, for last N-m retransmissions of the TB, a transmit manner is changed into an open-loop transmit manner when a transmission mode remains unchanged. Retransmission of the TB in the open-loop transmit manner can improve reliability of data transmission, reduce a quantity of retransmissions of the TB, reduce a residual block error rate and a voice packet loss rate, and ensure that a closed-loop gain can be effectively obtained.

18 Claims, 4 Drawing Sheets

(51) Int. Cl.
*H04W 28/06* (2009.01)
*H04W 72/12* (2009.01)

(56) References Cited

U.S. PATENT DOCUMENTS

2013/0064181 A1  3/2013 Jiang et al.
2015/0341956 A1* 11/2015 Sun ..................... H04L 1/0046
                                                  370/329
2016/0119947 A1  4/2016 Park et al.

FOREIGN PATENT DOCUMENTS

CN     102013948 A    4/2011
WO     2015133784 A1  9/2015

* cited by examiner

TRANSPORT BLOCK RETRANSMISSION METHOD AND BASE STATION

CROSS-REFERENCE TO RELATED APPLICATIONS

This application is a continuation of International Application No. PCT/CN2016/082297, filed on May 17, 2016, the disclosure of which is hereby incorporated by reference in its entirety.

TECHNICAL FIELD

The present application relates to wireless technologies, and in particular, to a transport block retransmission method and a base station.

BACKGROUND

A multiple-input multiple-output (MIMO) technology allows using a plurality of transmit antennas and a plurality of receive antennas at a transmit end and a receive end, respectively, so as to send and receive signals by using the plurality of antennas at the transmit end and the receive end, respectively. The MIMO technology is mainly used to improve a capacity and reliability of a channel.

Different MIMO transmission modes (TM) are defined for a Long Term Evolution (LTE) system. A base station informs, by using radio resource control (RRC) signaling, a terminal of a transmission mode used for a current physical downlink shared channel (PDSCH) and a related configuration parameter, and the terminal performs corresponding signal processing and reception. At present, a total of 10 TMs, TM1 to TM10, are defined for the LTE system. The MIMO technology is mainly classified into a spatial multiplexing technology and a space diversity technology. Spatial multiplexing is further classified into open-loop spatial multiplexing and closed-loop spatial multiplexing. A main difference between closed-loop spatial multiplexing and open-loop spatial multiplexing lies in that a terminal needs to feed back precoding matrix indicator (PMI) information in closed-loop spatial multiplexing. Closed-loop spatial multiplexing is used in TM4, TM6, TM8, TM9 and TM10, and open-loop spatial multiplexing is used in TM3. When closed-loop spatial multiplexing is used for data transmission, an incorrect PMI may be reported, causing a series of problems such as an increase in a residual block error rate and an increase in a packet loss rate. As a result, network performance is reduced.

SUMMARY

Embodiments of the present invention provide a transport block retransmission method and a base station, so as to reduce a residual block error rate and a packet loss rate and ensure that a closed-loop gain can be effectively obtained.

A first embodiment of the present invention provides a transport block retransmission method, where the method includes: initially transmitting, by a base station, a transport block (TB) to user equipment (UE) in a closed-loop spatial multiplexing transmit manner; when initial transmission of the TB fails, retransmitting, by the base station, the TB in the closed-loop spatial multiplexing transmit manner for first m retransmissions of the TB; and for last N-m retransmissions of the TB, retransmitting, by the base station, the TB in an open-loop transmit manner included in a transmission mode TM to which the closed-loop spatial multiplexing transmit manner belongs, where m is an integer greater than or equal to 0, N is a maximum quantity of retransmissions of the TB, and N is an integer greater than or equal to 1.

A second embodiment of the present invention provides a base station, where the base station includes a processing module and a transceiver module, where the processing module is configured to control the transceiver module to initially transmit a transport block TB to UE in a closed-loop spatial multiplexing transmit manner, and the processing module is further configured to, when initial transmission of the TB fails, control the transceiver module to retransmit the TB in the closed-loop spatial multiplexing transmit manner for first m retransmissions of the TB, and for last N-m retransmissions of the TB, retransmit the TB in an open-loop transmit manner included in a transmission mode TM to which the closed-loop spatial multiplexing transmit manner belongs, where m is an integer greater than or equal to 0, N is a maximum quantity of retransmissions of the TB, and N is an integer greater than or equal to 1.

Optionally, when the TM is TM4, the closed-loop spatial multiplexing transmit manner and the open-loop transmit manner are transmit manners supported in a DCI format 2.

Optionally, when the TM is TM5, the closed-loop spatial multiplexing transmit manner is a transmit manner supported in a DCI format 1D, and the open-loop transmit manner is a transmit manner supported in a DCI format 1A.

Optionally, when the TM is TM6, the closed-loop spatial multiplexing transmit manner is a transmit manner supported in a DCI format 1B, and the open-loop transmit manner is a transmit manner supported in a DCI format 1A.

Optionally, when the TM is TM8, the closed-loop spatial multiplexing transmit manner and the open-loop transmit manner are transmit manners supported in a DCI format 2B.

Optionally, when the TM is TM9, the closed-loop spatial multiplexing transmit manner and the open-loop transmit manner are transmit manners supported in a DCI format 2C.

Optionally, when the TM is TM10, the closed-loop spatial multiplexing transmit manner and the open-loop transmit manner are transmit manners supported in a DCI format 2D.

According to the transport block retransmission method and the base station provided in the embodiments of the present invention, for the first m retransmissions of the TB, the closed-loop spatial multiplexing transmit manner used for the initial transmission of the TB is maintained, and for the last N-m retransmissions of the TB, the transmit manner is changed into the open-loop transmit manner when the transmission mode remains unchanged. Retransmission of the TB in the open-loop transmit manner can improve reliability of data transmission, reduce a quantity of retransmissions of the TB, reduce a residual block error rate and a voice packet loss rate, and ensure that a closed-loop gain can be effectively obtained.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

A method in the embodiments of the present invention is applied to a MIMO system. In the MIMO system, a plurality of transmit antennas and a plurality of receive antennas are used at a transmit end and a receive end, respectively. The transmit end maps a to-be-transmitted data signal onto the plurality of antennas for transmission, and the receive end processes a signal received by the antennas. The MIMO technology is mainly classified into two types: a spatial multiplexing technology and a space diversity technology. In the spatial multiplexing technology, a plurality of different signals are transmitted on a same time-frequency resource in a spatial dimension and the different signals are distinguished at the receive end by using a spatial feature. This implements "multi-stream" transmission and therefore improves a transmission rate per unit time and per unit frequency. In the space diversity technology, a plurality of different transmission paths provided by a plurality of antennas are used to send a same signal, and the space diversity technology is mainly used to improve reliability of a radio link. Spatial multiplexing is further classified into open-loop spatial multiplexing and closed-loop spatial multiplexing. In the space diversity technology, an open-loop transmit manner is used at the transmit end. The open-loop transmit manner includes transmit diversity and single-port transmit (single-antenna port).

For ease of description, the following uses downlink MIMO as an example, but may also be applied to uplink MIMO as discussed herein. A base station selects different TMs based on a channel characteristic, and the channel characteristic includes received signal quality of a channel and spatial correlation of the channel. Each TM uses a different downlink control information (DCI) format, different DCI formats support different transmit manners, and a same DCI format may support only one transmit manner or a plurality of transmit manners.

Figure 1:
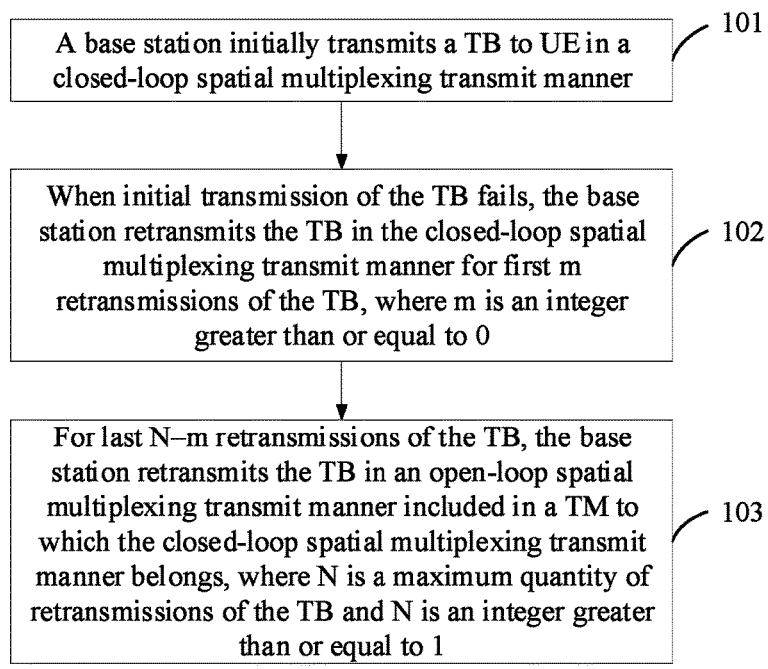
FIG. 1 is a transport block retransmission method according to Embodiment 1 of the present invention.

FIG. 1 is a transport block retransmission method according to Embodiment 1 of the present invention. As shown in FIG. 1, the method in this embodiment may include the following steps.

Step 101: A base station initially transmits a TB to UE in a closed-loop spatial multiplexing transmit manner.

Step 102: When initial transmission of the TB fails, the base station retransmits the TB in the closed-loop spatial multiplexing transmit manner for first m retransmissions of the TB, where m is an integer greater than or equal to 0.

Step 103: For last N-m retransmissions of the TB, the base station retransmits the TB in an open-loop spatial multiplexing transmit manner included in a TM to which the closed-loop spatial multiplexing transmit manner belongs, where N is a maximum quantity of retransmissions of the TB and N is an integer greater than or equal to 1.

The method in this embodiment can be applied to the following TMs, including but not limited to, TM4, TM5, TM6, TM8, TM9, and TM10. Table 1 lists related configuration parameters of each TM, and the parameters of each TM include a supported DCI format and a supported transmit manner.

TABLE 1

| TM type | DCI format | Transmit manner |
|---|---|---|
| TM4 | DCI format 1A | Transmit diversity |
|  | DCI format 2 | Closed-loop spatial multiplexing or transmit diversity |
| TM5 | DCI format 1A | Transmit diversity |
|  | DCI format 1D | Closed-loop spatial multiplexing |
| TM6 | DCI format 1A | Transmit diversity |
|  | DCI format 1B | Closed-loop spatial multiplexing |
| TM8 | DCI format 1A | If a quantity of PBCHs is 1, single-port transmit is used (a port 0 is used); otherwise, transmit diversity is used. |
|  | DCI format 2B | Dual-layer transmission (using a port 7 and a port 8) or single-port transmit (using the port 7 or the port 8) |
| TM9 | DCI format 1A | Non-MBSFN subframe: If a quantity of PBCHs is 1, single-port transmit is used (a port 0 is used); otherwise, transmit diversity is used. MBSFN subframe: single-port transmit (using a port 7) |
|  | DCI format 2C | Supporting a maximum of eight layers of transmission (using ports 7 to 14) or single-port transmit (using the port 7 or 8) |
| TM10 | DCI format 1A | Non-MBSFN subframe: If a quantity of PBCHs is 1, single-port transmit is used (a port 0 is used); otherwise, transmit diversity is used. MBSFN subframe: single-port transmit (using a port 7) |
|  | DCI format 2D | Supporting a maximum of eight layers of transmission (using ports 7 to 14) or single-port transmit (using the port 7 or 8) |

It can be learned from Table 1 that the closed-loop spatial multiplexing transmit manner includes: the closed-loop spatial multiplexing transmit manner supported in the DCI format 2 of TM4, the closed-loop spatial multiplexing transmit manner supported in the DCI format 1D of TM5, the closed-loop spatial multiplexing transmit manner supported in the DCI format 1B of TM6, the dual-layer transmission supported in the DCI format 2B of TM8, the maximum of eight layers of transmission supported in the DCI format 2C of TM9, and the closed-loop spatial multiplexing transmit manner supported in the DCI format 2D of TM10.

A purpose of using the closed-loop spatial multiplexing transmit manner is to improve a channel capacity. The closed-loop spatial multiplexing transmit manner is usually applicable to a scenario with a relatively good channel condition. In this embodiment, if the first m retransmissions of the TB all fail, it is very likely that a PMI beam points to a wrong direction. In this case, if a prior-art method is used, the TB is still retransmitted in the closed-loop spatial multiplexing transmit manner for the last N-m retransmissions of the TB, and a probability of a retransmission failure of the TB is still quite high. Consequently, a plurality of retransmission failures cause a larger residual block error rate and a larger packet loss rate. The residual block error rate is used to indicate a proportion of TB blocks of which downlink retransmission fails in a measurement period. A specific calculation formula is: Residual block error rate=Total quantity of packets with residual block errors in downlink TB blocks/Total quantity of the downlink TB blocks.

In this embodiment, the base station retransmits the TB in the open-loop transmit manner for the last N-m retransmissions of the TB. The open-loop transmit manner is a transmit manner included in the transmission mode TM to which the closed-loop spatial multiplexing transmit manner used for the initial transmission of the TB by the base station belongs. Using the open-loop transmit manner for the last N-m retransmissions of the TB can improve transmission reliability of the TB, increase a probability of transmission success, and reduce a quantity of retransmissions.

Specifically, for TM4, the base station initially transmits the TB to the UE in the closed-loop spatial multiplexing transmit manner; when the initial transmission of the TB fails, the base station still retransmits the TB in the closed-loop spatial multiplexing transmit manner for the first m retransmissions, and the base station retransmits the TB in the open-loop transmit manner for the last N-m retransmissions. The open-loop transmit manner may be a transmit manner supported in the DCI format 2 of TM4 or a transmit manner supported in the DCI format 1A of TM4. When the open-loop transmit manner is the transmit diversity manner supported in the DCI format 2, both the TM and the DCI format remain unchanged during the last N-m retransmissions of the TB. Because both the TM and the DCI format remain unchanged, problems of signaling overheads and delays caused by TM switching are reduced, and effective acquisition of a closed-loop gain can be ensured. When the open-loop transmit manner is the transmit diversity manner supported in the DCI format 1A, for the last N-m retransmissions of the TB, the TM remains unchanged, but the DCI format needs to be modified, and the DCI format is changed from the DCI format 2 to the DCI format 1A. In a same TM, compared with changing the transmit manner by modifying the TM, changing the transmit manner by modifying the DCI format reduces problems of signaling overheads and delays caused by TM switching, and effective acquisition of a closed-loop gain can be ensured.

Figure 2:
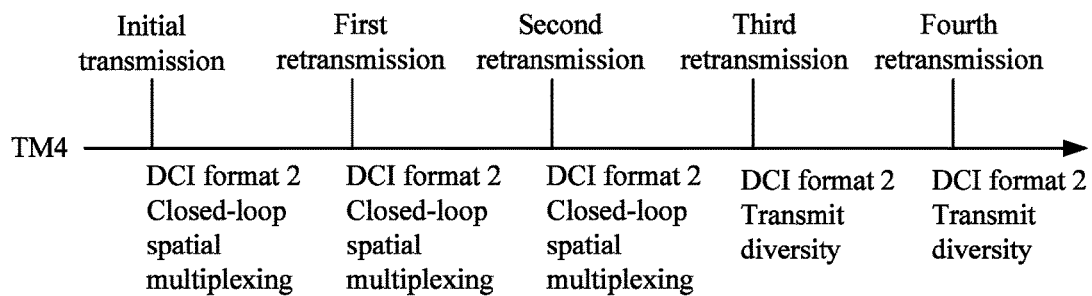
FIG. 2 is a schematic diagram of TB transmission in TM4.

FIG. 2 is a schematic diagram of TB transmission in TM4. In an example shown in FIG. 2, a value of m is 2, to be specific, the closed-loop spatial multiplexing transmit manner is used for first two retransmissions of the TB, and the transmit diversity manner supported in the DCI format 2 is used from the third retransmission to the last retransmission, and the DCI format remains unchanged in a retransmission process. A value of the maximum quantity N of retransmissions may be 8 or an integer less than 8, and the base station may configure the value of the maximum quantity of retransmissions depending on a requirement. Usually, the value of the maximum quantity of retransmissions is 4. When the maximum quantity of retransmissions is 4, the value of m is preferably 2.

For TM4, a cause of TB retransmission may be a hybrid automatic repeat request (HARQ) mechanism or a discontinuous transmission (DTX) mechanism. For the HARQ mechanism, when the UE fails to receive the initially transmitted TB correctly, the UE feeds back a negative acknowledgment NACK to the base station, and the base station retransmits the TB after receiving the NACK. For the retransmitted TB, the UE possibly still fails to receive the TB correctly, the UE continues to feed back a negative acknowledgment NACK to the base station, and the base station continues to retransmit the TB until the maximum quantity N of retransmissions is reached. For DTX, when the UE uses DTX, because the UE in an energy-saving state cannot be woken up in a timely manner, it is also likely that the UE cannot correctly receive the TB sent by the base station and consequently the base station retransmits the TB. In this embodiment, regardless of whether a TB transmission failure is caused by HARQ or DTX, the base station may use the closed-loop spatial multiplexing transmit manner to retransmit the TB for all the first m retransmissions of the TB. To be specific, a transmit manner for the first m retransmissions of the TB remains the same as that used for the initial transmission of the TB. Optionally, the base station may further determine a cause of the first m retransmissions of the TB. When the base station determines that DTX is used for the initial transmission of the TB and DTX is the cause of the first m retransmissions, the base station still retransmits the TB in the closed-loop spatial multiplexing transmit manner for the last N-m retransmissions of the TB, that is, a transmit manner for the last N-m retransmissions of the TB remains the same as that used for the initial transmission of the TB.

For TM5, the base station initially transmits the TB to the UE in the closed-loop spatial multiplexing transmit manner; when the initial transmission of the TB fails, the base station still retransmits the TB in the closed-loop spatial multiplexing transmit manner for the first m retransmissions, and the base station retransmits the TB in the open-loop transmit manner for the last N-m retransmissions. The open-loop transmit manner may be a transmit manner supported in the DCI format 1A. When the open-loop transmit manner is the transmit diversity manner supported in the DCI format 1A, for the last N-m retransmissions of the TB, the TM remains unchanged, but the DCI format needs to be modified, and the DCI format is changed from the DCI format 1D to the DCI format 1A. In a same TM, compared with changing the transmit manner by modifying the TM, changing the transmit manner by modifying the DCI format reduces problems of signaling overheads and delays caused by TM switching, and effective acquisition of a closed-loop gain can be ensured.

Figure 3:
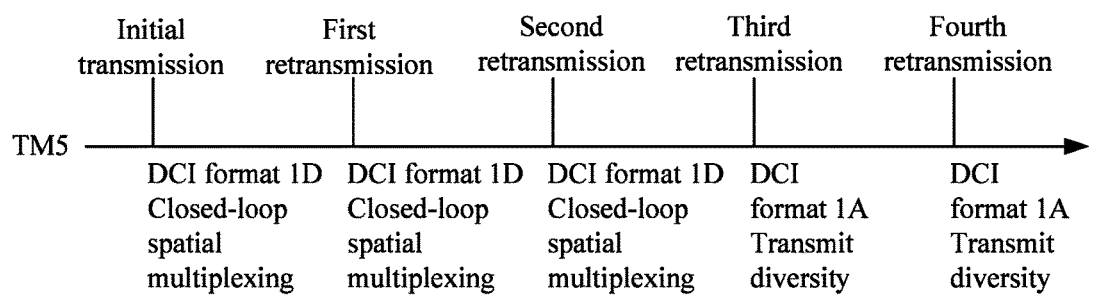
FIG. 3 is a schematic diagram of TB transmission in TM5.

FIG. 3 is a schematic diagram of TB transmission in TM5. The closed-loop spatial multiplexing transmit manner is used for the first two retransmissions of the TB, and the DCI format is the DCI format 1D. The transmit diversity manner is used from the third retransmission to the last retransmission, and the DCI format is changed into the DCI format 1A from the third retransmission.

For TM6, the base station initially transmits the TB to the UE in the closed-loop spatial multiplexing transmit manner; when the initial transmission of the TB fails, the base station still retransmits the TB in the closed-loop spatial multiplexing transmit manner for the first m retransmissions, and the base station retransmits the TB in the open-loop transmit manner for the last N-m retransmissions. The open-loop transmit manner may be the transmit diversity manner supported in the DCI format 1A of TM6. For the last N-m retransmissions of the TB, the TM remains unchanged, but the DCI format needs to be modified, and the DCI format is changed from the DCI format 1B to the DCI format 1A. In a same TM, compared with changing the transmit manner by modifying the TM, changing the transmit manner by modifying the DCI format reduces problems of signaling overheads and delays caused by TM switching, and effective acquisition of a closed-loop gain can be ensured.

Figure 4:
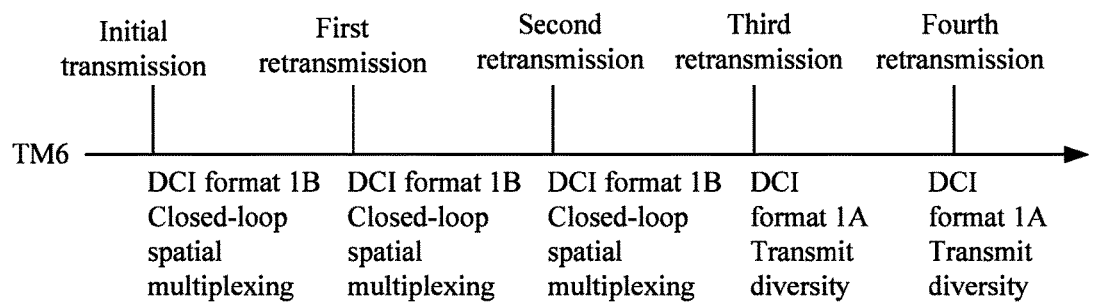
FIG. 4 is a schematic diagram of TB transmission in TM6.

FIG. 4 is a schematic diagram of TB transmission in TM6. The closed-loop spatial multiplexing transmit manner is used for the first two retransmissions of the TB, and the DCI format is the DCI format 1B. The transmit diversity manner is used from the third retransmission to the last retransmission, and the DCI format is changed into the DCI format 1A from the third retransmission.

For TM8, the base station initially transmits the TB to the UE in the closed-loop spatial multiplexing transmit manner; when the initial transmission of the TB fails, the base station still retransmits the TB in the closed-loop spatial multiplexing transmit manner for the first m retransmissions, and the base station retransmits the TB in the open-loop transmit manner for the last N-m retransmissions. The open-loop transmit manner may be a transmit manner supported in the DCI format 2B of TM8 or a transmit manner supported in the DCI format 1A of TM8. When the open-loop transmit manner is the single-port transmit manner supported in the DCI format 2B, both the TM and the DCI format remain unchanged during the last N-m retransmissions of the TB. Because both the TM and the DCI format remain unchanged, problems of signaling overheads and delays caused by TM switching are reduced, and effective acquisition of a closed-loop gain can be ensured. The port 7 or the port 8 is used for transmission in the single-port transmit manner supported in the DCI format 2B. Optionally, when the open-loop transmit manner is the single-port transmit manner or the transmit diversity manner supported in the DCI format 1A, for the last N-m retransmissions of the TB, the TM remains unchanged, but the DCI format needs to be modified, and the DCI format is changed from the DCI format 2B to the DCI format 1A. Specifically, if the quantity of physical broadcast channels (PBCH) is 1, the single-port transmit manner supported in the DCI format 1A is used, and the port 0 is used for transmission. In other cases, the transmit diversity manner supported in the DCI format 1A is used. In a same TM, compared with changing the transmit manner by modifying the TM, changing the transmit manner by modifying the DCI format reduces problems of signaling overheads and delays caused by TM switching, and effective acquisition of a closed-loop gain can be ensured.

For TM9, the base station initially transmits the TB to the UE in the closed-loop spatial multiplexing transmit manner; when initial transmission of the TB fails, the base station still retransmits the TB in the closed-loop spatial multiplexing transmit manner for the first m retransmissions, and the base station retransmits the TB in the open-loop transmit manner for the last N-m retransmissions. The open-loop transmit manner may be a transmit manner supported in the DCI format 2C, or may be the single-port transmit manner or the transmit diversity manner supported in the DCI format 1A. When the open-loop transmit manner is the single-port transmit manner supported in the DCI format 2C, both the TM and the DCI format remain unchanged during the last N-m retransmissions of the TB. Because both the TM and the DCI format remain unchanged, problems of signaling overheads and delays caused by TM switching are reduced, and effective acquisition of a closed-loop gain can be ensured. The port 7 or the port 8 is used for transmission in the single-port transmit manner supported in the DCI format 2C. When the open-loop transmit manner is the single-port transmit manner or the transmit diversity manner supported in the DCI format 1A, for the last N-m retransmissions of the TB, the TM remains unchanged, but the DCI format needs to be modified, and the DCI format is changed from the DCI format 2B to the DCI format 1A. Specifically, for a non-MBSFN subframe, if the quantity of PBCHs is 1, the single-port transmit manner supported in the DCI format 1A is used, and the port 0 is used for transmission. In other cases, the transmit diversity manner supported in the DCI format 1A is used. For an MBSFN subframe, the port 7 or the port 8 is used for transmission in the single-port transmit manner supported in the DCI format 1A. In a same TM, compared with changing the transmit manner by modifying the TM, changing the transmit manner by modifying the DCI format reduces problems of signaling overheads and delays caused by TM switching, and effective acquisition of a closed-loop gain can be ensured.

For TM10, the base station initially transmits the TB to the UE in the closed-loop spatial multiplexing transmit manner; when the initial transmission of the TB fails, the base station still retransmits the TB in the closed-loop spatial multiplexing transmit manner for the first m retransmissions, and the base station retransmits the TB in the open-loop transmit manner for the last N-m retransmissions. The open-loop transmit manner may be a transmit manner supported in the DCI format 2D, or may be the single-port transmit manner or the transmit diversity manner supported in the DCI format 1A. When the open-loop transmit manner is the single-port transmit manner supported in the DCI format 2D, both the TM and the DCI format remain unchanged during the last N-m retransmissions of the TB. Because both the TM and the DCI format remain unchanged, problems of signaling overheads and delays caused by TM switching are reduced, and effective acquisition of a closed-loop gain can be ensured. The port 7 or the port 8 is used for transmission in the single-port transmit manner supported in the DCI format 2D. When the open-loop transmit manner is the single-port transmit manner or the transmit diversity manner supported in the DCI format 1A, for the last N-m retransmissions of the TB, the TM remains unchanged, but the DCI format needs to be modified, and the DCI format is changed from the DCI format 2D to the DCI format 1A. Specifically, for a non-MBSFN subframe, if the quantity of PBCHs is 1, the single-port transmit manner supported in the DCI format 1A is used, and the port 0 is used for transmission. In other cases, the transmit diversity manner supported in the DCI format 1A is used. For an MBSFN subframe, the port 7 or the port 8 is used for transmission in the single-port transmit manner supported in the DCI format 1A. Because the TM remains unchanged, the effective acquisition of the closed-loop gain can be still ensured.

Figure 5:
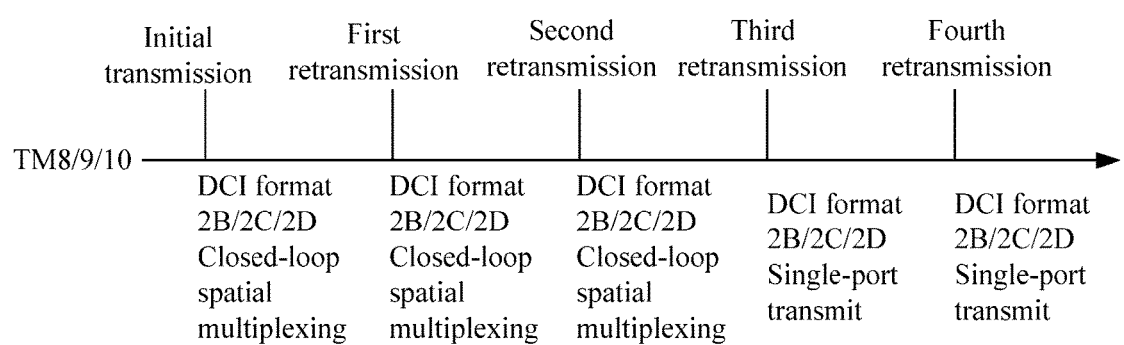
FIG. 5 is a schematic diagram of TB transmission in TM8/TM9/TM10.

FIG. 5 is a schematic diagram of TB transmission in TM8/TM9/TM10. In TM8/TM9/TM10, the closed-loop spatial multiplexing transmit manner is used for the first two retransmissions of the TB, the single-port transmit manner is used from the third retransmission to the last retransmission, and the DCI format remains unchanged in a retransmission process.

According to the method provided in this embodiment, for the first m retransmissions of the TB, the closed-loop spatial multiplexing transmit manner used for the initial transmission of the TB is maintained, and for the last N-m retransmissions of the TB, the transmit manner is changed into the open-loop transmit manner when the transmission mode remains unchanged. Retransmission of the TB in the open-loop transmit manner can improve reliability of data transmission, reduce a quantity of retransmissions of the TB, and reduce a residual block error rate and a packet loss rate. In addition, the transmission mode is not changed, thereby ensuring effective acquisition of the closed-loop gain.

Figure 6:
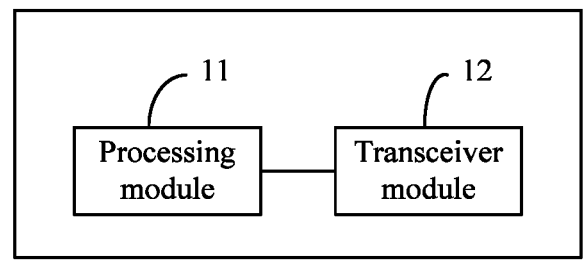
FIG. 6 is a schematic structural diagram of a base station according to Embodiment 2 of the present invention.

FIG. 6 is a schematic structural diagram of a base station according to Embodiment 2 of the present invention. As shown in FIG. 6, the base station provided in this embodiment includes a processing module 11 and a transceiver module 12.

The processing module 11 is configured to control the transceiver module 12 to initially transmit a TB to UE in a closed-loop spatial multiplexing transmit manner.

The processing module 11 is further configured to, when initial transmission of the TB fails, control the transceiver module 12 to retransmit the TB in the closed-loop spatial multiplexing transmit manner for first m retransmissions of the TB, and for last N-m retransmissions of the TB, retransmit the TB in an open-loop transmit manner included in a transmission mode TM to which the closed-loop spatial multiplexing transmit manner belongs, where N is a maximum quantity of retransmissions of the TB, m is an integer greater than or equal to 0, and N is an integer greater than or equal to 1. Optionally, a value of m is 2.

Optionally, when the TM is TM4, the closed-loop spatial multiplexing transmit manner and the open-loop transmit manner are transmit manners supported in a DCI format 2. Optionally, the processing module 11 is further configured to determine that the initial transmission of the TB uses DTX and DTX is a cause of the first m retransmissions, and control the transceiver module 12 to retransmit the TB in the closed-loop spatial multiplexing transmit manner for the last N-m retransmissions of the TB.

Optionally, when the TM is TM5, the closed-loop spatial multiplexing transmit manner is a transmit manner supported in a DCI format 1D, and the open-loop transmit manner is a transmit manner supported in a DCI format 1A.

Optionally, when the TM is TM6, the closed-loop spatial multiplexing transmit manner is a transmit manner supported in a DCI format 1B, and the open-loop transmit manner is a transmit manner supported in a DCI format 1A.

Optionally, when the TM is TM8, the closed-loop spatial multiplexing transmit manner and the open-loop transmit manner are transmit manners supported in a DCI format 2B.

Optionally, when the TM is TM9, the closed-loop spatial multiplexing transmit manner and the open-loop transmit manner are transmit manners supported in a DCI format 2C.

Optionally, when the TM is TM10, the closed-loop spatial multiplexing transmit manner and the open-loop transmit manner are transmit manners supported in a DCI format 2D.

According to the base station in this embodiment, functional modules of the base station may be configured to implement the method in the foregoing Embodiment 1. Specific implementations and technical effects thereof are similar, and details are not described herein again.

Figure 7:
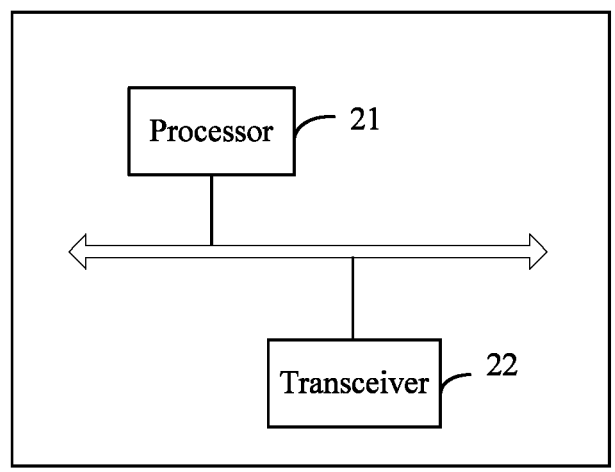
FIG. 7 is a schematic structural diagram of a base station according to Embodiment 3 of the present invention.

FIG. 7 is a schematic structural diagram of a base station according to Embodiment 3 of the present invention. As shown in FIG. 7, the base station provided in this embodiment includes a processor 21 and a transceiver 22. The processor 21 and the transceiver 22 are connected by using a bus.

The processor 21 is configured to control the transceiver 22 to initially transmit a TB to UE in a closed-loop spatial multiplexing transmit manner.

The processor 21 is further configured to, when initial transmission of the TB fails, control the transceiver 22 to retransmit the TB in the closed-loop spatial multiplexing transmit manner for first m retransmissions of the TB, and for last N-m retransmissions of the TB, retransmit the TB in an open-loop transmit manner included in a TM to which the closed-loop spatial multiplexing transmit manner belongs, where N is a maximum quantity of retransmissions of the TB, N is an integer greater than or equal to 1, and m is an integer greater than or equal to 0. Optionally, a value of m is 2.

Optionally, when the TM is TM4, the closed-loop spatial multiplexing transmit manner and the open-loop transmit manner are transmit manners supported in a DCI format 2. Optionally, the processor 21 is further configured to determine that the initial transmission of the TB uses discontinuous transmission DTX and DTX is a cause of the first m retransmissions, and control the transceiver 22 to retransmit the TB in the closed-loop spatial multiplexing transmit manner for the last N-m retransmissions of the TB.

Optionally, when the TM is TM5, the closed-loop spatial multiplexing transmit manner is a transmit manner supported in a DCI format 1D, and the open-loop transmit manner is a transmit manner supported in a DCI format 1A.

Optionally, when the TM is TM6, the closed-loop spatial multiplexing transmit manner is a transmit manner supported in a DCI format 1B, and the open-loop transmit manner is a transmit manner supported in a DCI format 1A.

Optionally, when the TM is TM8, the closed-loop spatial multiplexing transmit manner and the open-loop transmit manner are transmit manners supported in a DCI format 2B.

Optionally, when the TM is TM9, the closed-loop spatial multiplexing transmit manner and the open-loop transmit manner are transmit manners supported in a DCI format 2C.

Optionally, when the TM is TM10, the closed-loop spatial multiplexing transmit manner and the open-loop transmit manner are transmit manners supported in a DCI format 2D.

The base station in this embodiment may be configured to execute the method in Embodiment 1. Specific implementations and technical effects thereof are similar, and details are not described herein again.

The foregoing embodiments are described by using downlink MIMO as an example. The solutions of the present invention may also be applied to uplink MIMO. To be specific, when sending a TB to the base station, the UE may also retransmit the TB by using the method in the foregoing embodiments. Specific implementations and technical effects thereof are similar, and details are not described herein again.

In addition, the user equipment in the embodiments of the present invention may be a wireless terminal. The wireless terminal may be a device that provides voice and/or data connectivity for a user, a handheld device with a wireless connection function, or another processing device connected to a wireless modem. The wireless terminal may communicate with at least one core network by using a radio access network (RAN). The wireless terminal may be a mobile terminal, for example, a mobile phone (also referred to as a "cellular" phone) or a computer with a mobile terminal. For example, the wireless terminal may be a portable mobile apparatus, a pocket-sized mobile apparatus, a handheld mobile apparatus, a computer built-in mobile apparatus, or an in-vehicle mobile apparatus. These mobile apparatuses exchange voice and/or data with the radio access network. The wireless terminal may also be referred to as a subscriber unit, a subscriber station, a mobile station, a remote station, an access point, a remote terminal, an access terminal, a user terminal, a user agent, or user equipment. This is not limited herein.

The base station in the embodiments of the present invention may be a base transceiver station (BTS) in a Global System for Mobile Communications (GSM) or Code Division Multiple Access (CDMA), may be a NodeB (NB) in Wideband Code Division Multiple Access (WCDMA), may be an evolved NodeB (eNB), an access point, or a relay station in an LTE network, or may be a base station in a next-generation network (namely, a 5G network), or the like. This is not limited herein.

In embodiments, the base stations and user equipment described herein may execute one or more functional units to perform the operations of the described embodiments. The software functional units may be stored in a storage medium and includes several instructions for instructing a processor of a device (e.g., a base station or a user equipment device) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Persons of ordinary skill in the art may understand that all or some of the steps of the methods in the embodiments may be implemented by a program instructing relevant hardware (for example, a processor). The program may be stored in a computer readable storage medium. The storage medium may include: a read-only memory, a random access memory, a magnetic disk, an optical disc, or the like.

Persons of ordinary skill in the art may know that with evolution of network architectures and emergence of new application scenarios, the technical solutions provided in the embodiments of the present invention are also applicable to similar technical issues.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A transport block retransmission method, comprising:
    transmitting, by a base station in an initial transmission, a transport block (TB) to user equipment (UE) using closed-loop spatial multiplexing;
    when transmission of the TB fails, retransmitting, by the base station, the TB using the closed-loop spatial multiplexing for a first m retransmissions of the TB, wherein m is an integer greater than or equal to 0; and
    for a last N-m retransmissions of the TB, retransmitting, by the base station, the TB using open-loop spatial multiplexing having a transmission mode (TM) to which the closed-loop spatial multiplexing belongs, wherein N is a maximum quantity of retransmissions of the TB and N is an integer greater than or equal to 1.

2. The method according to claim 1, wherein when the TM is TM4, the closed-loop spatial multiplexing and the open-loop spatial multiplexing are supported in a downlink control information (DCI) format 2.

3. The method according to claim 2, wherein the method further comprises:
    determining, by the base station, that the initial transmission of the TB uses discontinuous transmission (DTX) and a reason for the first m retransmissions is DTX; and
    retransmitting, by the base station, the TB using the closed-loop spatial multiplexing for the last N-m retransmissions of the TB.

4. The method according to claim 1, wherein when the TM is TM5, the closed-loop spatial multiplexing is supported in a downlink control information (DCI) format 1D, and the open-loop spatial multiplexing is supported in a DCI format 1A.

5. The method according to claim 1, wherein when the TM is TM6, the closed-loop spatial multiplexing is supported in a downlink control information (DCI) format 1B, and the open-loop spatial multiplexing is supported in a DCI format 1A.

6. The method according to claim 1, wherein when the TM is TM8, the closed-loop spatial multiplexing and the open-loop spatial multiplexing are supported in a downlink control information (DCI) format 2B.

7. The method according to claim 1, wherein when the TM is TM9, the closed-loop spatial multiplexing and the open-loop spatial multiplexing are supported in a downlink control information (DCI) format 2C.

8. The method according to claim 1, wherein when the TM is TM10, the closed-loop spatial multiplexing and the open-loop spatial multiplexing are supported in a downlink control information (DCI) format 2D.

9. The method according to claim 1, wherein a value of m is 2.

10. A base station, comprising:
    a processor configured to control a transceiver to transmit a transport block (TB) to user equipment (UE) using closed-loop spatial multiplexing; and
    the processor is further configured to:
        when initial transmission of the TB fails, control the transceiver to retransmit the TB using the closed-loop spatial multiplexing for a first m retransmissions of the TB, wherein m is an integer greater than or equal to 0, and
        for a last N-m retransmissions of the TB, control the transceiver to retransmit the TB using open-loop spatial multiplexing having a transmission mode (TM) to which the closed-loop spatial multiplexing belongs, wherein N is a maximum quantity of retransmissions of the TB and N is an integer greater than or equal to 1.

11. The base station according to claim 10, wherein when the TM is TM4, the closed-loop spatial multiplexing and the open-loop spatial multiplexing are supported in a downlink control information (DCI) format 2.

12. The base station according to claim 11, wherein the processor is further configured to:
    determine that the initial transmission of the TB uses discontinuous transmission (DTX) and a reason for the first m retransmissions is DTX; and
    retransmit the TB using the closed-loop spatial multiplexing for the last N-m retransmissions of the TB.

13. The base station according to claim 10, wherein when the TM is TM5, the closed-loop spatial multiplexing is supported in a downlink control information (DCI) format 1D, and the open-loop spatial multiplexing is supported in a DCI format 1A.

14. The base station according to claim 10, wherein when the TM is TM6, the closed-loop spatial multiplexing is supported in a downlink control information (DCI) format 1B, and the open-loop spatial multiplexing is supported in a DCI format 1A.

15. The base station according to claim 10, wherein when the TM is TM8, the closed-loop spatial multiplexing and the open-loop spatial multiplexing are supported in a downlink control information (DCI) format 2B.

16. The base station according to claim 10, wherein when the TM is TM9, the closed-loop spatial multiplexing and the open-loop spatial multiplexing are transmit manners supported in a downlink control information (DCI) format 2C.

17. The base station according to claim 10, wherein when the TM is TM10, the closed-loop spatial multiplexing and the open-loop spatial multiplexing are supported in a downlink control information (DCI) format 2D.

18. The base station according to claim 10, wherein a value of m is 2.

* * * * *